No. 638,252. Patented Dec. 5, 1899.
E. LE FEVRE.
ADDING MACHINE.
(Application filed Apr. 11, 1898.)
(No Model.)
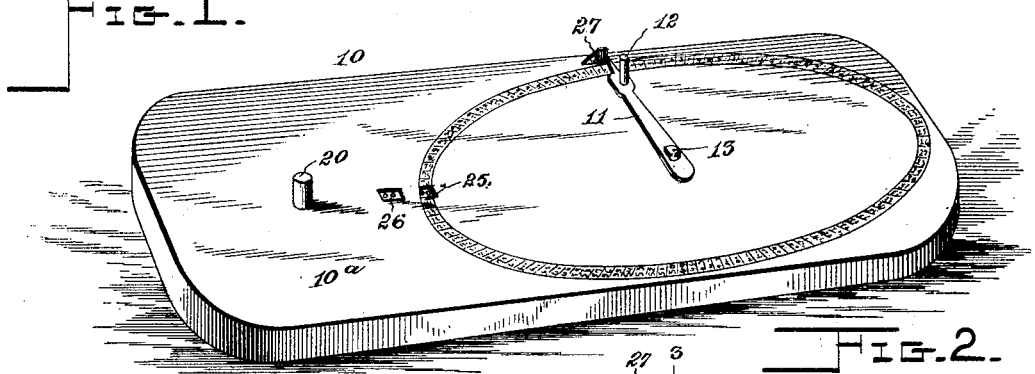
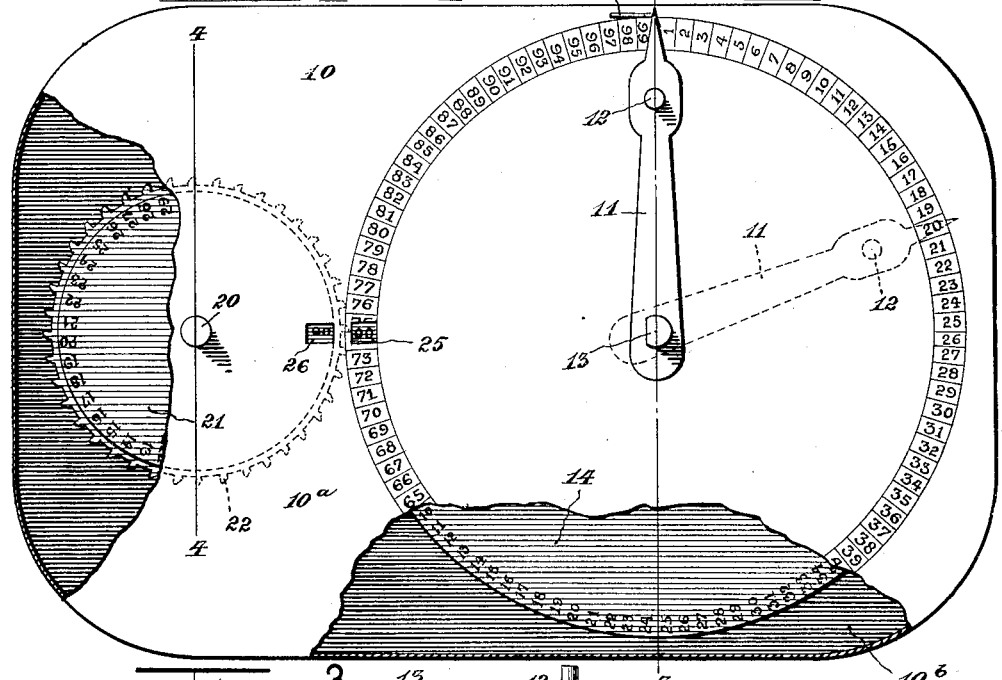
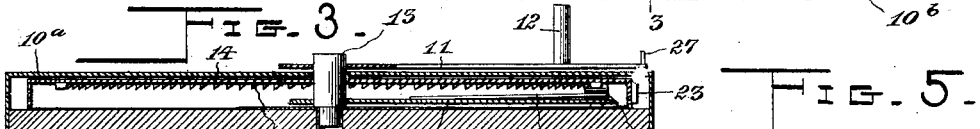
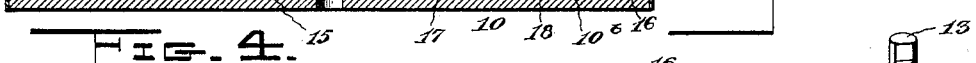
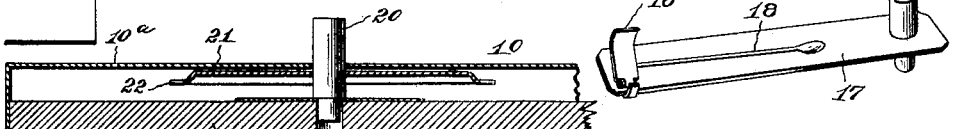
Witnesses
Edward Le Fevre, Inventor
By his Attorneys,

UNITED STATES PATENT OFFICE.

EDWARD LE FEVRE, OF ROSENDALE, WISCONSIN.

ADDING-MACHINE.

SPECIFICATION forming part of Letters Patent No. 638,252, dated December 5, 1899.

Application filed April 11, 1898. Serial No. 677,201. (No model.)

*To all whom it may concern:*

Be it known that I, EDWARD LE FEVRE, a citizen of the United States, residing at Rosendale, in the county of Fond du Lac and State of Wisconsin, have invented a new and useful Postal Cancellation-Recording Machine, of which the following is a specification.

My invention relates to adding-machines, and particularly to a registering device designed especially for keeping account of the values of postage-stamps canceled by postmasters, as when the salary of the postmaster depends upon the sum of the values of postage-stamps on mail passing through his office; and the object in view is to provide a simple, inexpensive, and efficient device capable of manipulation with facility and adapted to automatically add and expose the result of the addition of a number of successive amounts registered thereon.

Further objects and advantages of this invention will appear in the following description, and the novel features thereof will be particularly pointed out in the appended claim.

In the drawings, Figure 1 is a perspective view of a registering device constructed in accordance with my invention. Fig. 2 is a plan view, partly in section, of the same. Figs. 3 and 4 are transverse sections, respectively, upon the planes indicated by the lines 3 3 and 4 4 of Fig. 2. Fig. 5 is a detail view of the pawl-carrying operating-arm.

Similar reference characters indicate corresponding parts in all the figures of the drawings.

The registering device embodying my invention includes a casing or box 10, of which the upper wall is provided with a dial or scale of numbers ranging, preferably, from "0" to "99," said dial being traversed by a pointer 11, fulcrumed concentric with the dial and provided near its free end with a grip 12. The spindle 13 of the pointer is provided above the plane of the dial with a pointer-seat, upon which the pointer is seated and from which it is adapted to be removed with facility to allow the detachment of the flanged upper wall $10^a$ of the casing from the base or lower wall $10^b$. Below the plane of the dial and within the casing the spindle 13 is fitted with a units-disk 14, provided with an annular series of units and tens numerals, ranging from "0" to "99," but increasing in the opposite direction from the numerals of the dial, said disk being revolubly fitted upon the spindle to allow the movement of the spindle independently thereof, and upon the under side of the disk is arranged an annular series of ratchet-teeth 15 for engagement by a pawl 16, carried by an arm 17, which is fixed to the spindle. A spring 18 is employed to maintain the pawl 16 in operative engagement with the ratchet-teeth. The pawl-carrying arm 17 is preferably fixed to the spindle 13 below the plane of the loosely-mounted units-disk 14, and the spring-actuated pawl 16 is disposed to engage the teeth 15 on the inside of said disk, whereby any resistance to the forward rotation of the disk, due to the gravity thereof, will be relieved to a certain extent during the forward motion of the arm 17 by the pressure of the pawl 16 to facilitate said forward movement of the disk. If preferred, suitable means common in the art may be employed for preventing backward or reverse rotation of the disk 14; but it is obvious that the pawl 16 will slip idly over the ratchet-teeth during the backward or reverse movement of the arm 17, and hence such retaining means may be omitted, and therefore I have deemed it unnecessary to illustrate such retaining means in the drawings, the same forming no part of my present invention. Also carried by a spindle 20, which is parallel with the spindle 13 and is mounted in registering bearings in the upper and lower sides of the casing, is a hundreds-disk 21, provided with a peripheral series of spurs or teeth 22 for successive engagement by a spur 23 on the periphery of the units-disk 14. The spindle 20 of the hundreds-disk extends above the upper surface of the front wall $10^a$ of the casing to form a grip by which the hundreds-disk may be turned to zero when desired. One numeral each of the units and hundreds disks is exposed through the inspection-opening in the front wall of the casing, that of the units-disk being indicated at 25 and that of the hundreds-disk at 26. Also arranged in the path of backward movement of the pointer 11 is a stop 27.

In operation the amounts of the stamps canceled at different operations are indicated upon the register by turning the pointer from zero, as shown in full lines in Fig. 2, to the number representing the amount of the stamps, as "20." (Shown in dotted lines in Fig. 2.) After turning the pointer to the number indicating the amount of the cancellation the pointer is returned to its normal or zero position. During the forward movement of the pointer motion is communicated by the operating-arm 17 and the pawl 16 to the disk 14, whereby when the forward movement of the pointer ceases a number, as "20," corresponding with the position of the extremity of the pointer upon the dial, is shown in the inspection-opening 25. Upon the return movement of the pointer the pawl 16 slips idly over the teeth of the disk 14. Upon the succeeding forward movement of the pointer the disk is again carried forward to expose through the inspection-slot 25 a number representing the sum of the last number indicated through said inspection-opening and the added number, as shown upon the dial by the pointer. In this way successive amounts may be indicated by means of the pointer upon the dial and are successively added to show the sum in the inspection-opening 25 until this sum reaches "99," whereupon a further movement of the disk 14 will cause the movement of the hundreds-disk through one step to indicate the number of hundreds through the inspection-slot 26. In this way the amounts of stamps canceled successively may be indicated and automatically added, whereby at the end of the operation the gross amount is indicated through the inspection-openings, and the number there indicated may be transferred to a suitable account-book, as in the ordinary practice.

Various changes in the form, proportion, and the minor details of construction may be resorted to without departing from the spirit or sacrificing any of the advantages of the invention.

Having described my invention, what I claim is—

In a registering device of the class described, the combination of a casing having upper and lower walls, of which the former is provided with an exterior dial and adjacent inspection-openings, a pointer-spindle mounted in the casing, and a pointer carried by said spindle exteriorly of the casing to traverse the dial on the upper wall, a units-disk loosely mounted for revoluble movement upon the said spindle within the casing and provided at its under side with an annular series of ratchet-teeth, an operating-arm fixed to the spindle beneath the plane of said disk, a pawl carried by said arm for engagement with the ratchet-teeth of the disk, a spring for imparting upward pressure to said pawl to maintain it terminally in operative relation with the ratchet-teeth, said disk being adapted to be advanced in only one direction by movement in a corresponding direction of said pointer, and a disk of higher denomination also mounted in the casing and adapted to receive a step-by-step motion from the units-disk, each disk being adapted for exposure at one point through one of said inspection-openings in the upper wall of the casing, substantially as specified.

EDWARD LE FEVRE.

Witnesses:
FRANK BOWE,
C. E. McCUMBER.